United States Patent [19]

Pemberton

[11] Patent Number: 5,564,024
[45] Date of Patent: Oct. 8, 1996

[54] APPARATUS FOR CONNECTING AND DISCONNECTING PERIPHERAL DEVICES TO A POWERED BUS

[76] Inventor: Adam C. Pemberton, 159 Umpawaug Rd., West Redding, Conn. 06896

[21] Appl. No.: 284,352

[22] Filed: Aug. 2, 1994

[51] Int. Cl.[6] .................................................. G06F 13/20
[52] U.S. Cl. ................................. 395/283; 439/928.1
[58] Field of Search .......................... 395/283, 282, 395/281; 439/928, 928.1

[56] References Cited

U.S. PATENT DOCUMENTS

| | | | |
|---|---|---|---|
| 4,835,737 | 5/1989 | Herrig et al. | 395/283 |
| 4,999,787 | 3/1991 | McNally et al. | 364/514 |
| 5,268,592 | 12/1993 | Bellamy et al. | 307/43 |
| 5,317,697 | 5/1994 | Husak et al. | 395/283 |

OTHER PUBLICATIONS

IBM Technical Disclosure Bulletin vol. 29, No. 3 "Control Circuit For Hot Plugging a ROS Cartridge", Aug. 1986.

*Primary Examiner*—Jack B. Harvey
*Assistant Examiner*—Jeffrey K. Seto
*Attorney, Agent, or Firm*—Ohlandt, Greeley, Ruggiero & Perle

[57] ABSTRACT

A connecter for use with peripheral devices connected to computer systems via a bus includes circuitry for placing a powered bus in a reset condition thus allowing a peripheral device to be connected to or disconnected from the bus without removing power from either the computer system or the bus. The connector also includes circuitry which, when coupled to the bus, provides active termination in accordance with the SCSI bus protocol.

5 Claims, 3 Drawing Sheets

APPARATUS FOR CONNECTING AND DISCONNECTING PERIPHERAL DEVICES TO A POWERED BUS

BACKGROUND OF THE INVENTION

This invention relates generally to computer systems and in particular to peripheral devices which are connected to a computer system via a bus.

As it is known in the art, computer systems generally include at least one central processing unit (CPU), a memory, and some type of mass storage device such as a disk drive. A typical computer operates by reading and executing program instructions which have been read from a mass storage device and placed in the memory.

As is also known in the art, mass storage devices are typically coupled to a computer system via bus which operates in accordance with a so called bus protocol. The protocol defines the nature of the signals used to produce a proper interface between the computer system bus and the mass storage device. One such protocol in wide use today is the so called Small Computer System Interface (SCSI).

The Small Computer System Interface is a widely implemented standard for transferring data between a host computer and a peripheral device such as magnetic hard disk, streaming tape backup mechanism, CD-ROM drive, or other peripheral device. The SCSI standard allows up to seven devices to be connected to the host in a so called daisy-chain configuration. Each device in the chain has a unique ID, numbered 0 through 6 (ID 7 is reserved for the host).

Many business applications, such as multimedia development or database management, run on typical computer systems require access to extremely large data Fries typically stored on commensurately large capacity (e.g. greater than one gigabyte) storage devices. Although these large capacity storage devices provide adequate storage solutions, their cost can be prohibitively expensive. As such, many small businesses will own as few as one such device and share it among many users.

The modern trend in accommodating many users sharing a single large capacity storage device is through the use of a network. With a network, several computer systems are linked either together or to common resources such as high capacity storage devices or both. Although this arrangement provides a measure of convenience for each user, it can also be prohibitively expensive since each computer connected to a network requires additional hardware and software to facilitate connection to the network. Additionally, at present network technology, data transfer rate over a network does not match the rate at which data can be transferred to and from a processor via a storage device directly connected to the computer via a bus such as the SCSI bus described above. As an example, graphics departments, multimedia developers, and database creators routinely share large files (50+MB). The network approach to snaring the files typically requires the use of a local area network (LAN) such as Localtalk, Ethernet, or Novell, etc. These networks transfer data at a relatively slow (10 Mbit/sec) transfer rates. The slow transfer rate of the currently implemented network protocols degrades performance on both sending and receiving computers (and fileservers, if used) while the file transfer takes place. With these networks, the transfer of a typical file from the large capacity device can range from 10 to 60 minutes or more, depending on file size. In addition, other network traffic suffers while these large files are sent Another approach involves the use of a removable media storage solution. The removable media may be for example, a hard disk, optical or magneto-optical mechanism that is designed to accept storage media in the form of a removable cartridge. This facilitates the exchange of large amounts of data between users who have such a mechanism connected to their computer. In general, the transfer rate of removable media drives is comparable to that of the SCSI interface. However, the cost of placing such a mechanism on every users desktop can be prohibitive to many smaller business As a result of the above described limitations, many businesses have resorted to swapping large capacity storage devices among multiple computer systems. That is, when one user requires access to one of the large files stored on a large capacity storage device, the device will be physically disconnected from one computer and reconnected to the system needing access to the data files. Although physically moving devices among several computer systems alleviates many of the problems described above, this technique is not without its own drawbacks.

As stated in most user manuals supplied with computer systems or adapter cards incorporating the SCSI bus protocol and manuals supplied with peripheral devices designed to operate in accordance with the SCSI protocol, there are certain requirements which must be followed when inserting or removing SCSI devices from the SCSI chain.

Before physically connecting (or removing) a device to the SCSI chain (i.e., plugging the SCSI cable in), all devices in the chain, including the host, must be turned off. This requirement is due to the design of the SCSI controllers used in both the host computer and the target SCSI devices. Failure to adhere to the stated requirements may result in permanent electrical damage to both the host system and the peripheral device.

This limitation of powering down all devices (including the computer) before adding or removing a device from the SCSI chain prevents the easy sharing of a SCSI device between different computers. Users must stop any work in progress, power down the system, attach a SCSI device (obeying rules of SCSI termination) and then restart the computer. To share a single hard disk, this requires two shutdowns and two power-ups as the peripheral device is removed from the first computer (after being powered down first) attached to the second computer (after being powered down first) and then both computers restarted. The result is a complete interruption of all work in profess on both computers, and the time required for the shut-down/restart cycles. In practice, this means devices that could be shared (spare hard dish, tape backups, etc.) are not shared due to the inconvenience.

Additionally, in order to conform to the SCSI bus protocol, each end of the daisy chain arrangement needs to be physically terminated. Termination of a SCSI device typically involves providing a 330 ohm resistance between each signal line and a ground potential, and a 220 ohm resistance between each signal line and +5 v. For SCSI devices designed to be mounted internally within the CPU enclosure termination is typically supplied via a number of single in-line resistor packages (SIPs) which are socketed to a circuit board associated with the internal device. External SCSI mechanisms (i.e. those having their own power supplies, enclosure, etc.) may be configured to provide termination in a similar manner. However, to facilitate the daisy chaining of external peripheral devices the termination is often provided in the form of a connector which is coupled to an external port of the last SCSI device in the SCSI chain. The connector includes similar SIPs as those used with internal devices and thus provides the required termination. This type of so called "passive termination" does not always provide the proper termination parameters for the SCSI bus, particularly in complex, multiple-device chains.

To provide improved termination, a digital active termination circuit may be employed. Digital active termination provides a way to actively regulate the voltage and impedance on all the SCSI data and control lines. However, digital active termination alone does not provide any protection to the devices on the SCSI chain during addition or removal of a device from the active (powered) chain.

SUMMARY OF THE INVENTION

In accordance with the present invention, an apparatus includes a connector for coupling a peripheral device to a powered bus. The powered bus includes a plurality of signal lines including a logic ground signal line and a reset signal line. The peripheral device also includes a plurality of signal lines including a logic ground signal line and a reset signal line. During normal operation of the peripheral device, the connector provides proper signal levels on each of the plurality of signal lines. Additionally, when a peripheral device is being disconnected or connected to the powered bus, the connector maintains the proper signal levels on required signal lines. With such an arrangement, a peripheral device can be connected to or disconnected from a powered bus without the need to remove operating power from the bus or the computer system to which it is connected.

Further, in accordance with the present invention, a method of removing a peripheral device from a powered bus includes the steps of, asserting a reset signal on a reset signal line of the powered bus and then disconnecting all signal lines of the peripheral device, except the logic ground signal line, from the respective signal lines of the bus. After asserting the reset, and disconnecting all signal lines except the logic ground signal line, the logic ground signal line is disconnected. Once all signal lines have been disconnected in the proper sequence, the reset signal is de-asserted. With such a method, a peripheral device can be removed from a powered bus without the need to remove operating power from the bus or the computer system to which it is connected.

In accordance with another aspect of the present invention, a method of adding a peripheral device to a powered bus includes the steps of asserting a reset signal on a reset signal line of the powered bus and connecting the logic ground signal line of the peripheral device to the logic ground signal line of the powered bus line. After asserting the reset signal and connecting the respective logic ground signal lines, the remaining signal lines of the powered bus are connected to the respective remaining signal lines of the peripheral device. Once all connections have been made in the proper sequence, the reset signal is de-asserted. With such a method, a peripheral device can be added to a powered bus without the need to remove operating power from the bus or the computer system to which it is connected.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

DETAILED DESCRIPTION OF THE PREFERRED EMBODIMENT

Figure 1:
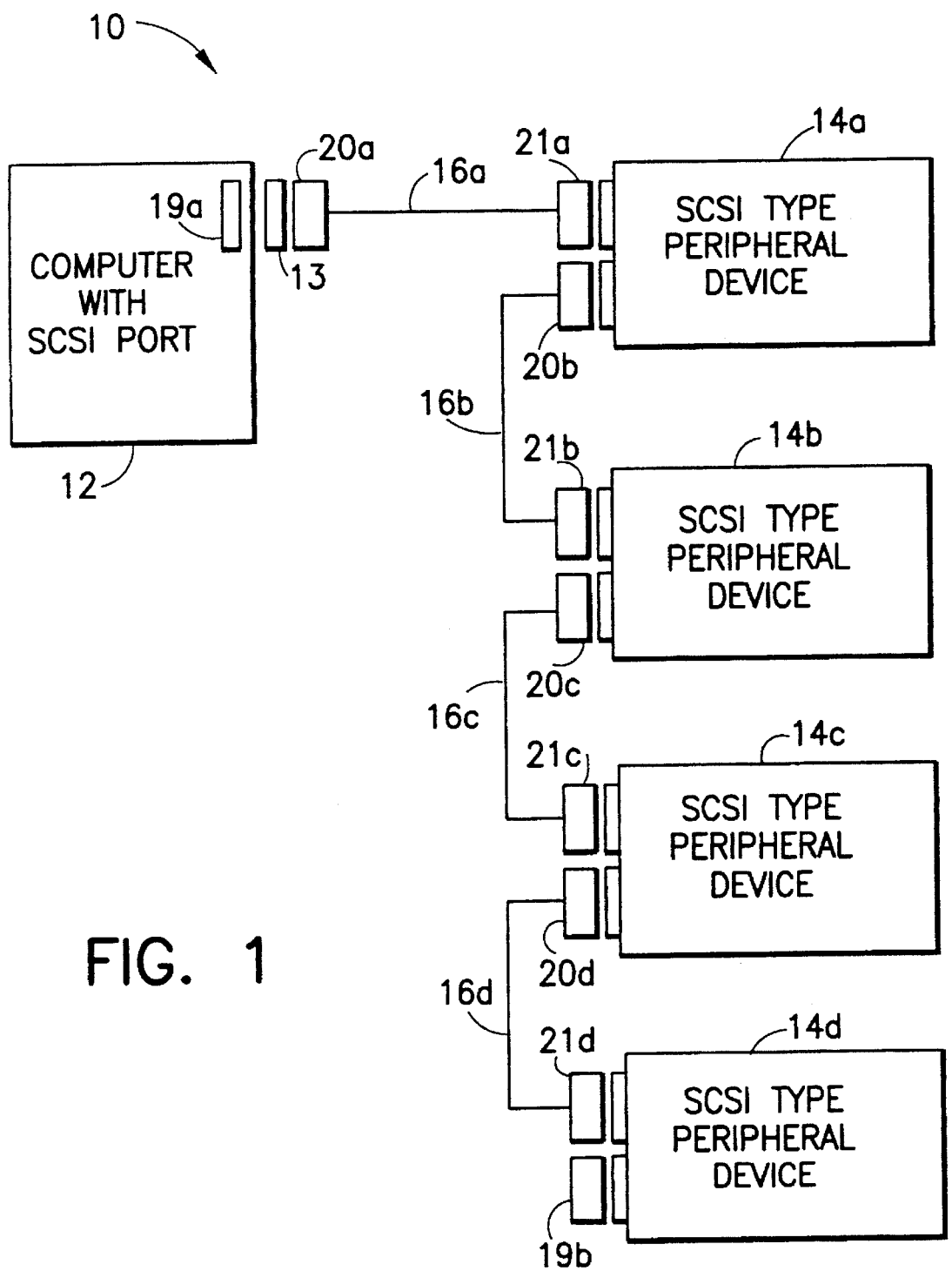
FIG. 1 is a diagram of a computer system including several SCSI type peripheral devices.

Referring now to FIG. 1, computer system 10 is shown to include a central processing unit (CPU) 12 coupled to external peripheral devices 14a–14d. CPU 12 further includes peripheral connection port 13. The port is configured for connection to a particular type of peripheral device, for example, those operating in conformance with the Small Computer Systems Interface (SCSI) protocol. As such port 13 provides an electrical connection between a connector 20a and an input/output (I/O) controller (not shown) within CPU 12. Ports 13 is connected to the I/O controller via a signal bus (not shown) and configured to provide the proper electrical connection between the I/O controller and the peripheral devices 14a–14d. In a preferred embodiment of the present invention, the I/O controller, signal bus, and port 13 will be designed to accommodate the connection of peripheral devices conforming to the SCSI protocol. Thus, peripheral devices 14a–14d conform to the SCSI protocol.

Still referring to FIG 1, peripheral devices 14a–14d are coupled to CPU 12 in a so called daisy chain arrangement. That is, peripheral device 14a is coupled directly to CPU 12 while peripheral device 14b is connected to peripheral device 14a. The dam path between device 14a and CPU 12 is provided via signal cable 16a which includes connectors 20a and 21a coupled to opposite ends. Connectors 20a and 21a provide the electromechanical connection between CPU 12 and cable 16a and device 14aand cable 16a respectively. Although not directly connected to CPU 12, a signal path is established between peripheral device 14b and CPU 12 via peripheral device 14a since peripheral device 14b is coupled to peripheral device 14a via signal cable 16b and connectors 20b and 21b. A signal path between remaining peripheral devices 14c–14d and CPU 12 is provided in a like manner. Additionally since the SCSI standard requires physical termination at the location of the first and last devices on the chain, the first device (typically an internal storage device) is terminated within the CPU via terminator 19a.

Once computer system 10 is powered and running, in order to comply with the SCSI protocol, no additional SCSI devices may be added and none may be removed without following the proper procedures. The proper procedure includes turning off the power to the computer system and each SCSI device in the chain. Powering down the computer system also includes exiting any software application which may have been running on the computer system in order to avoid data corruption or loss. This powering down procedure can take many minutes and lead to lost productivity. Additionally, if the last device in the daisy chain of devices is removed, proper termination must be established at the new last device.

Figure 2:
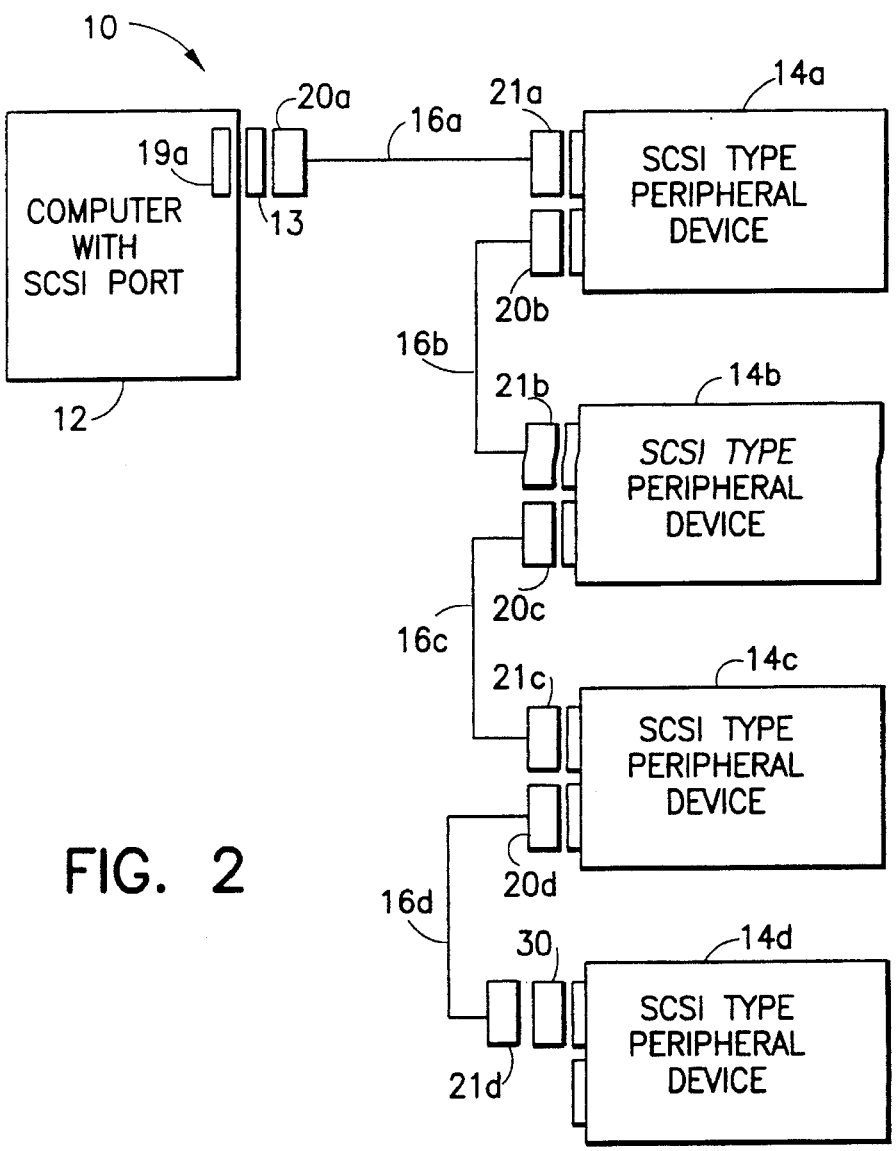
FIG. 2 is a diagram of a computer system including several SCSI type peripheral devices and an additional connector.

According to one aspect of the present invention, a connecter is provided which provides the capability of adding and removing devices from a computer system without having to power down the computer system. Referring now to FIG. 2, computer system 10 is shown to include an inn-line connector 30 coupled between connector 21d and peripheral device 14d. With connector 30, the last device in the SCSI chain, for example peripheral device 14d, can be removed or replaced without requiring that the computer system 10 be powered off. Further, no device at all is required to be connected at all to connector 30. Since connector 30 provides termination, the SCSI bus will operate properly with connector 30 providing end of chain termination. By configuring connector 30 at the end of a cable attached to the last device, access to the SCSI bus is provided without first having to remove a device.

Figure 3:
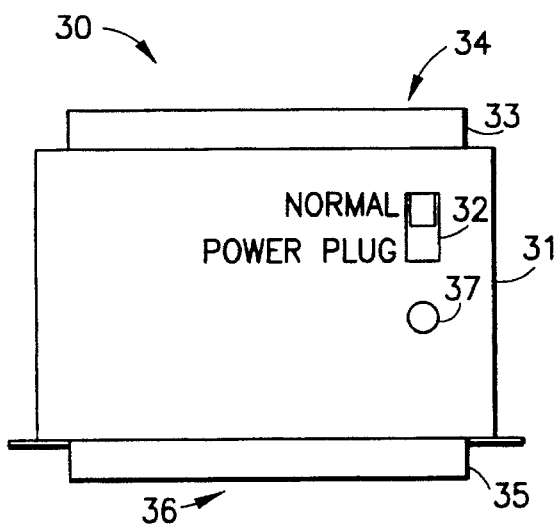
FIG. 3 is a diagram of the connector of the connector of FIG 2.

Referring now to FIG. 3, in-line connector 30 is shown to include a body 31, a reset switch 32, an LED indicator 37, and interface connections 34 and 36. As shown, connector 30 is configured such that interface connections 34 and 36 provide proper physical engagement to a Centronics type 50 pin connector which is commonly used with SCSI peripheral devices.

Interface connections 34 and 36 further include metal shrouds 33 and 35 extending beyond the interface pins (not shown). The shrouds 33 and 35 are configured such that during engagement of connector 30 with either connector 21d or 22d (FIG. 2), contact between the metal shroud and a respective metal shroud on either of connectors 21d or 22d will be established before contact is established between the interface pins of interface connectors 30 and respective interface pins of connectors 21a or 22a. Typically, interface connection 34 is attached to a cable that is connected to the last device on the chain and interface connection 35 is used to make a connection to a new last device or another SCSI peripheral.

Figure 4:
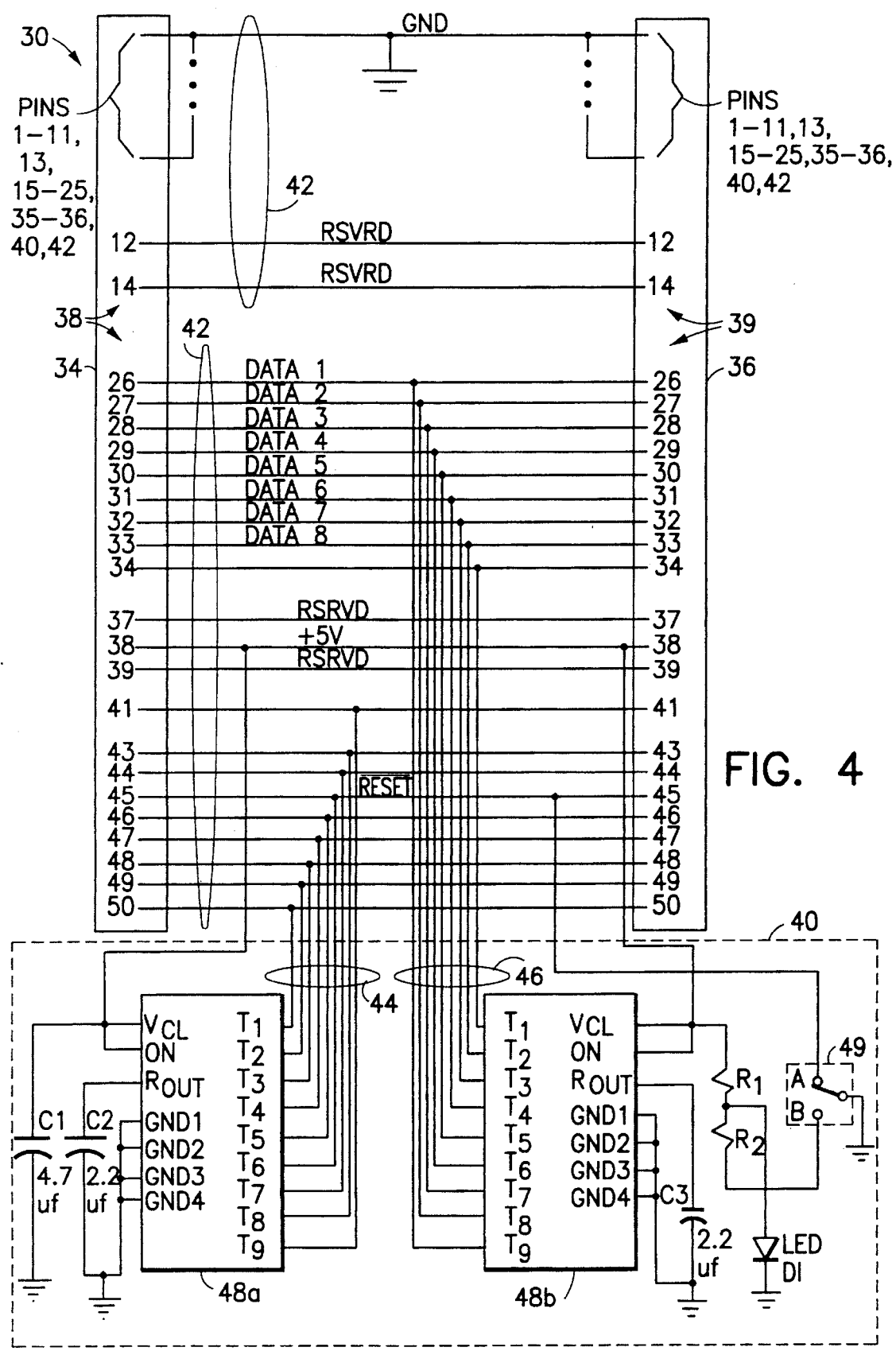
FIG. 4 is a schematic diagram of the circuitry contained within the connector of FIG. 3.

Referring now to FIG. 4, connector 30 is shown to further include circuit 40 coupled to signal lines 42 via signal lines 44 and 46. Signal lines 42 are further coupled to the 50 interface pins of interface connection 34 and to the 50 interface pins of interface connection 36. There is a one to one correspondence between the interface pins of interface connection 34 and the interface pins of interface connection 35. That is, the first through fiftieth interface pins of interface connection 34 are coupled to the first through fiftieth interface pins of interface connection 36 respectively via signal lines 42. In addition, all of the logic ground signal lines of the signal lines 42 are coupled together. When interface connection 34 is coupled to the SCSI bus, all logic ground signal lines are further coupled to shroud 33 which is internally coupled to shroud 35 (FIG. 3), effectively coupling shroud 35 to logic ground.

Circuit 40 further includes 9-line SCSI active terminators 48a and 48b such as the Unitrode model UC5603. Outputs T1–T9 of terminator 48a are coupled to a subset of signal lines 42 (i.e. the SCSI control signal lines) via signal lines 44. Terminator 48a has its Vet input coupled to the +5 v signal line of signal lines 42. Additionally the ground inputs of terminator 48a are coupled to a ground reference potential.

Outputs T1–T8 of terminator 48b are coupled to the data lines (Data 1 –Data 8) of signal lines 42 via signal lines 46. Output T9 of terminator 48b is coupled to a SCSI control line. Like terminator 48a, the Vcc input of terminator 48b is coupled to the +5 v signal line of signal lines 42. Circuit 40 further includes a two-position switch 49 coupled to terminator 48b in such a manner that when the switch is in position A, the RESET signal line of signal lines 42 is coupled to a ground reference potential. When the switch is placed in position B, the RESET signal is disconnected from the ground reference potential.

Also included in circuit 40 is an LED D1 which has its first end coupled to +5 v through resistor R1. LED D1 also has its first end coupled to switch 49 through resistor R2 such that when switch 49 is in position B, the first end of LED D1 is coupled to a ground reference potential. To provide proper operation, the second end of LED D1 is coupled to the ground reference potential.

Still referring to FIG. 4, the operation of circuit 40 will now be discussed. During normal operation of computer system 10 (FIG. 2), circuit 40 should not interfere with normal data transactions between the CPU 12 and any of the peripheral devices 14a–14d (FIG. 2). This is accomplished by placing switch 49 in position B. When in position B, the terminators 48a and 48b will receive proper supply voltage and operate to provide active termination on signal lines 42 in compliance with the requirements of the SCSI bus protocol. Additionally, values of R1 and R2 are chosen such that when switch 49 is in position B, LED D1 will not be biased with sufficient forward voltage to operate. Therefore the LED D1 does not illuminate when switch 49 is in position B and thus provides an indication that it IS NOT safe to remove device 14d from the SCSI chain.

When it becomes necessary or desirable to disconnect or connect a device from the powered system 10 (FIG. 2), switch 49 should be activated to position A. This will cause the RESET signal line to be coupled to a ground reference potential and thus cause the SCSI bus to be placed in a reset condition. Asserting a reset signal on the SCSI bus causes each SCSI controller coupled to the bus to assume a high impedance state on all signal lines, preventing current flow to or from the controllers, thus alleviating any risk of electrical damage to the controllers.

Additionally, when switch 49 is placed in position A, the first end of LED D1 is decoupled from ground and thereby allows a necessary forward voltage to illuminate LED D1. Since it is safe to connect and disconnect devices to the SCSI bus while the bus is in a reset condition, the LED D1, when illuminated, provides an indication that it is safe to do so.

Once switch 49 is placed in position A, connector 30 can be physically disconnected from the target SCSI peripheral device, for example peripheral device 14d (FIG. 2). As described above, during disconnection, shroud 35 maintains contact with the shroud of the mating connector associated with the target peripheral device until and slightly after the interface pins of the respective connectors have been disengaged. Disconnecting the connector from the device in such a manner allows the SCSI bus to be maintained in a proper state, as required of the SCSI protocol, without the need to power down the computer system (and other SCSI devices) as required of prior art systems.

Having described a preferred embodiment of the invention, it will now become apparent, to one of skill in the art that other embodiments incorporating its concepts may be used. It is felt therefore, that this invention should not be limited to the disclosed embodiment, but rather should be limited only by the spirit and scope of the appended claims.

What is claimed is:

1. A connector for coupling a data processing device to host processor via a bus, while said host processor remains powered, said bus including signal lines, a logic ground line and a reset line, said connector comprising:

switch means coupled between said reset line and an assert reset logic potential, for enabling a user to manually induce an assert reset level on said reset line, said host processor responding to said assert reset level by inducing a high impedance interconnect interface to said bus;

indicator means coupled to said switch means for indicating that it is permissible to connect said data processing device to said bus;

means for assuring, upon connection by said user of said data processing device to said bus that said logic ground line is connected to said bus before said signal lines and, upon disconnection, that said logic ground line is disconnected after disconnection of said signal lines; and wherein said switch means, indicator means and means for assuring are all housed in an interface connector body, said interface connector body including first connector means for pluggably receiving a bus connector and second connector means pluggably insertable into a bus connector on said data processing device.

2. A connector as recited in claim 1, wherein said indicator means indicates a presence of said assert reset level on said reset line as a result of operation of said switch means.

3. A connector as recited in claim 1, wherein said means for assuring comprises:

a shroud surrounding contacts carrying signals from at least said signal lines, said shroud positioned to couple to a logic ground level in said data processing device when interconnected with said bus connector before said contacts make connection with said bus connector.

4. A connector as recited in claim 1, wherein said indicator means is coupled between a power line in said bus and said switch means, closure of said switch means enabling application of sufficient potential from said power line to said indicator means to cause operation thereof.

5. A connector as recited in claim 1, wherein said bus operates in conformity with a Small Computer Systems Interface Protocol.

* * * * *